3,313,943
PHOTO-ELECTRIC REGISTRATION SYSTEM WITH PULSE SIGNAL DELAY

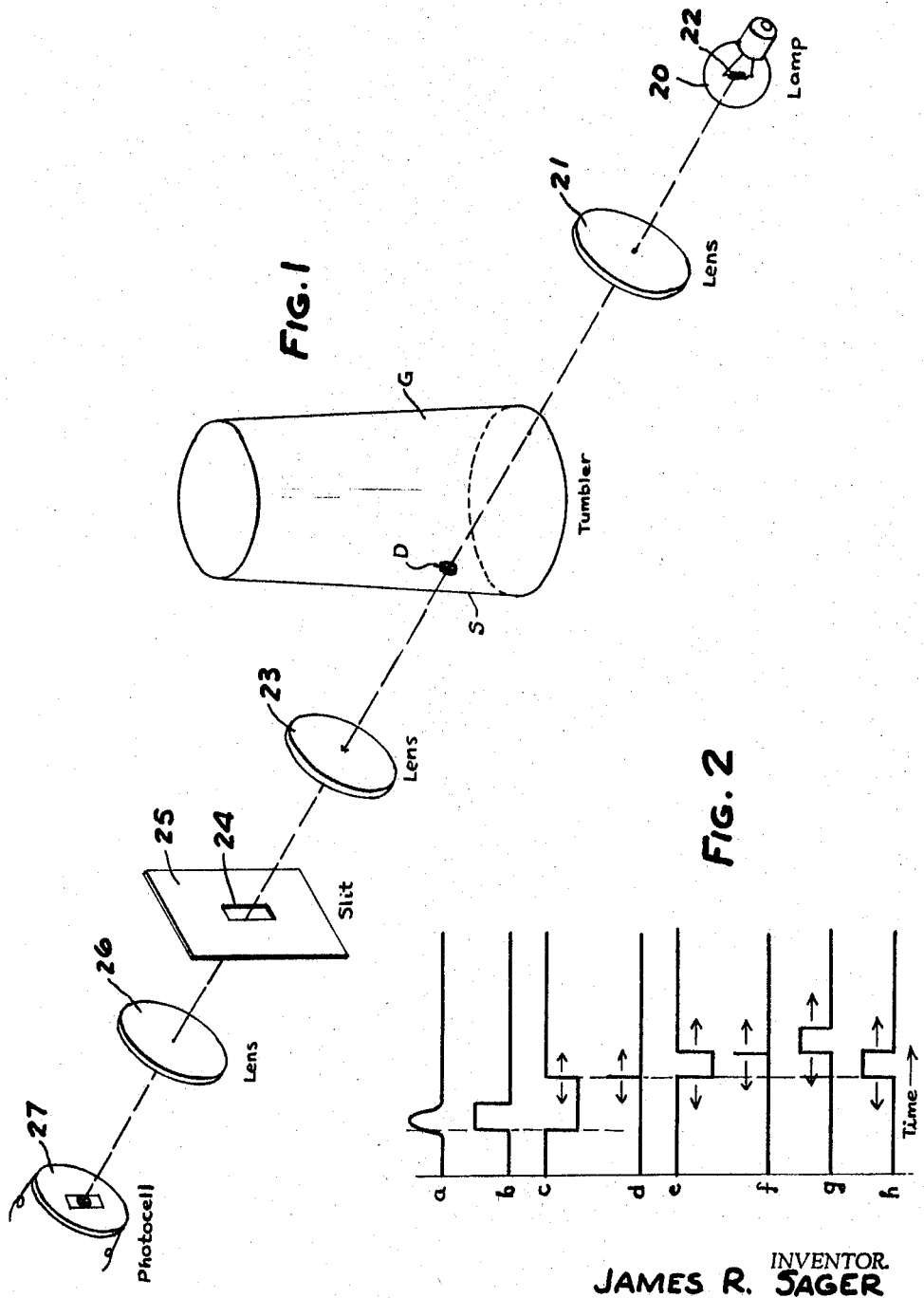

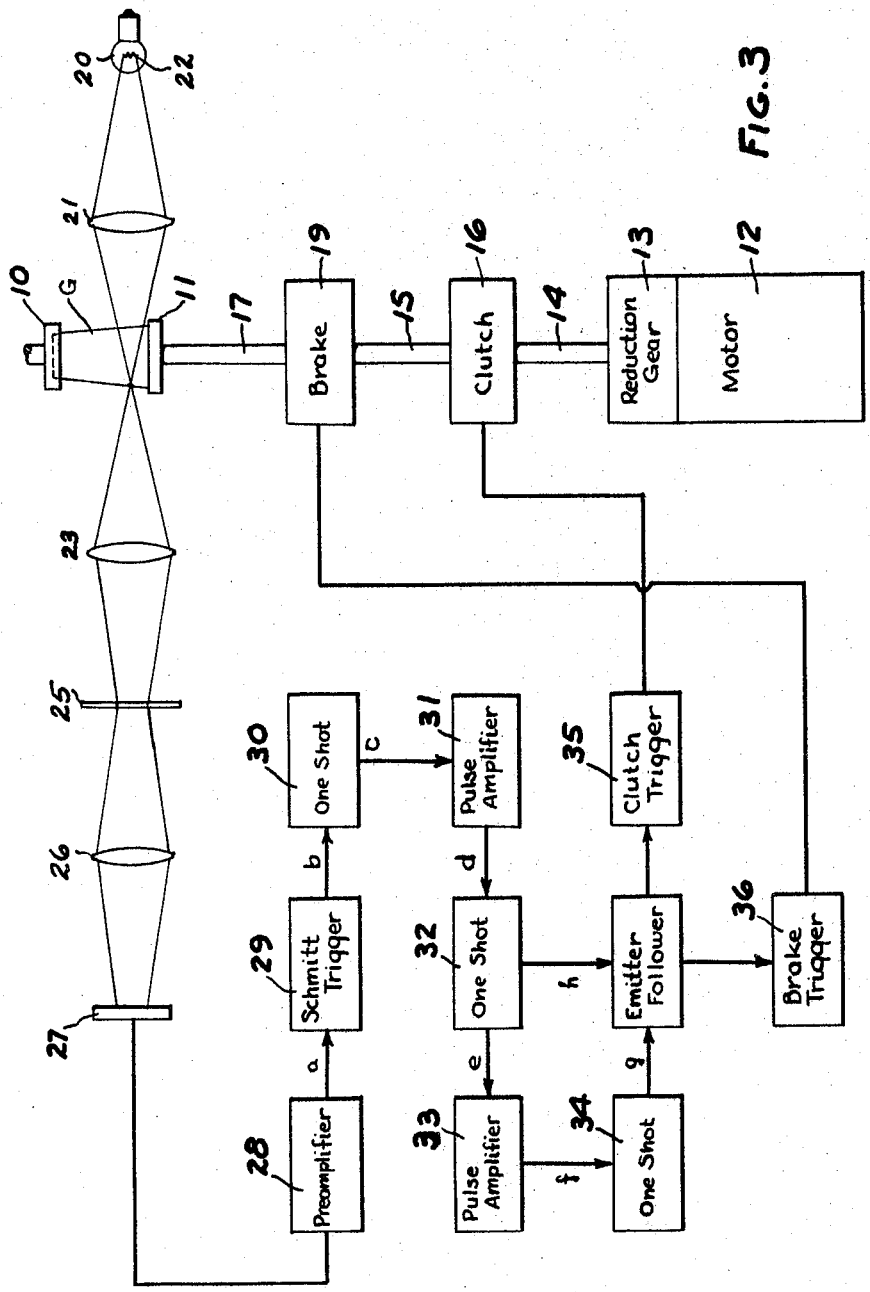

James R. Sager, Toledo, Ohio, assignor to Owens-Illinois, Inc., a corporation of Ohio
Filed Sept. 26, 1963, Ser. No. 311,734
6 Claims. (Cl. 250—222)

This invention relates to multi-color decoration of articles of transparent material such as glassware and particularly to indexing or registering such articles for the application of successive color decorations.

It is an object of this invention to provide a novel apparatus for accurately indexing or registering an article of transparent material for application of successive colors.

It is a further object of the invention to provide such apparatus which is relatively simple and incorporates a great degree of flexibility.

Basically, the apparatus comprises means for rotating an article about its axis with respect to which it is to be oriented, means for directing a beam of light on the surface of the article, means in the normal path for focusing the image of a spot on a plane, a mask in said plane, a light sensitive element and means in the path of said beam for focusing the image of the slit and the spot on the light sensitive element. The apparatus further includes means for creating a signal in response to the energization of the light sensitive element which comprises means for amplifying the signal, means for creating a signal of predetermined time interval, means for creating a pulse signal in response to the trailing edge of the signal of a predetermined time interval and means responsive to the pulse signal for stopping rotation of the article.

In the drawings:
FIG. 1 is a diagrammatic perspective view of an apparatus embodying the invention.
FIG. 2 is a pulse diagram of the electrical pulses utilized.
FIG. 3 is a partly diagrammatic block diagram of the apparatus embodying the invention.

Referring to the drawings, the invention relates to orienting an article G, such as a tumbler made of glass or other transparent material, when it is held between chucks 10, 11 in order that the article will be rotated to a predetermined position and stopped at said position for application of successive colors or decoration. The apparatus may be used in connection with a single pair of chucks 10, 11 or successive pairs of chucks 10, 11 at different stations.

As shown in FIG. 3, the apparatus comprises a motor 12 which through reduction gearing 13 rotates a shaft 14 which, in turn, drives a shaft 15 through a clutch 16. To in turn drive a shaft 17 brake 19 is provided to stop the rotation of the shaft 17 on which the chuck 11 is supported. Chuck 10 may be spring loaded to hold the article G in clamped relation.

In accordance with the invention, a beam of radiant energy, to which the article G is transparent, is directed from an incandescent light bulb 20 and focused by a lens 21 on the surface S of the article G. The filament 22 of the light bulb is preferably oriented so that it is parallel to the axis of the article G about which the article is rotated. A spot D, such as a square of opaque material, has been previously applied to the surface S of the article G.

Also as shown in FIGS. 1 and 3, another lens 23 is positioned in the path of the beam of light and is adapted to focus the image of the spot D onto a slit 24 of a mask 25 positioned at the focal point of the lens 23. The image of the slit 24 and spot D is then focused by a lens 26 positioned in the path of the beam onto a light sensitive element 27, such as a photocell.

When the clutch 16 is engaged and the brake 17 is disengaged, the article G is rotated about its axis. The passage of the spot D into the path of the beam of light causes an image of the spot D to be focused on the photocell. This creates an electrical signal which is utilized to de-energize the clutch 16 and energize the brake 17.

Specifically referring to FIG. 3, the signal from the light sensitive element 27 is amplified by pre-amplifier 28 and passes to a Schmitt trigger 29 which creates a pulse $b$. This pulse $b$ in turn passes to a one-shot multivibrator that creates a pulse $c$ of predetermined time interval. The degree of time interval of the pulse $c$ determines the extent of further rotation of the tumbler G before its movement is interrupted. In this manner, it is possible to orient the tumbler to a predetermined position after the spot D has intersected the light beam.

Referring to FIGS. 2 and 3, the trailing edge of the pulse $c$ creates a pulse signal $d$ which passes to a one-shot multivibrator 32. This signal is then amplified by amplifier 33 and again passes through a multi-vibrator 34 to create a signal $g$ for de-energizing clutch 16 through a clutch trigger 35. The signal $h$ from one-shot multivibrator 32 passes through an emitter follower too, after a predetermined time delay, energize the brake 17 through a trigger 36.

It is thus possible in accordance with the invention to specifically stop the rotation of an article and orient it at a predetermined angular position with respect to the point of original interception of the light beam by the spot. This is controlled by the time delay introduced by one-shot multivibrator 30. The time delay between the signal for de-energizing the clutch and energizing the brake is sufficient only to permit a proper disengagement of the clutch.

It has been found that, in accordance with the invention, it is possible to accurately position an article so that multiple colors can be applied, utilizing the indexing spot D. The spot D can be of a type which will be removed when the article is subsequently washed or otherwise subjected to further operation, such as firing of the decoration.

The term "light beam" as used herein is intended to mean any beam of radiant energy to which the article is transparent.

I claim:
1. In an apparatus for indexing an article of transparent material for multi-color decoration wherein a spot of opaque material is applied to the surface of said article, the combination comprising
means for rotating said article about an axis with respect to which the article is to be oriented,
means for directing and focusing a beam of light on the surface of said article so that an image of said spot is formed when the spot intersects the beam as the article is rotated,
means in the normal path of said beam for focusing the image of said spot on a plane,
a mask including a slit positioned in said plane in the normal path of the light beam,
a light sensitive element in the normal path of the beam,
means in the path of said beam for focusing the image of said slit and said spot on said light sensitive element,
means for creating a signal in response to the energization of said light sensitive element by said spot, and means for stopping the rotation of said rotating means in response to said signal, said signal creating means including means for amplifying said signal, means for creating a signal of predetermined time interval in response to said first mentioned signal, means for creating a pulse signal in response to the trailing edge of said signal of predetermined time interval, and means responsive to said pulse signal for stopping said rotation of said article.

2. The combination set forth in claim 1 wherein said means responsive to said signal includes a clutch, a brake, means for energizing said clutch actuated by said pulse signal and delay actuated means for actuating said brake in response to said pulse signal after a predetermined time delay.

3. The combination set forth in claim 2 wherein said delay actuated means include means for creating a brake operating signal of predetermined magnitude, said brake being operated by the trailing edge of said brake operating signal.

4. In an apparatus for indexing an article of transparent material for multi-color decoration wherein a spot of opaque material is applied to the surface of said article, the combination comprising means for rotating said article about an axis with respect to which the article is to be oriented, means for directing and focusing a beam of light on the surface of said article so that an image of said spot is formed when the spot intersects the beam as the article is rotated, means in the normal path of said beam for focusing the image of said spot on a plane, a mask including a slit positioned in said plane in the normal path of said light beam, a light sensitive element in the normal path of the beam, means in the path of said beam for focusing the image of said slit and said spot on said light sensitive element, means for creating a signal in response to the energization of said light sensitive element by said spot, means for amplifying said signal, a Schmitt trigger to which said amplified signal is directed, a one-shot receiving the signal from said Schmitt trigger and for creating a signal of predetermined time interval, means for creating a pulse signal in response to the trailing edge of said signal of predetermined time interval, and means responsive to said pulse signal for stopping said rotation of said article.

5. The combination set forth in claim 4 wherein said means responsive to said signal includes a clutch, a brake, means for de-energizing said clutch actuated by said pulse signal, and delay actuated means for actuating said brake in response to said pulse signal after a predetermined time delay.

6. The combination set forth in claim 5 wherein said delay actuated means include means for creating a brake operating signal of predetermined magnitude, said brake being operated by the trailing edge of said brake operating signal.

References Cited by the Examiner

UNITED STATES PATENTS

| 1,824,432 | 9/1931 | Hendry | 198—33 |
| 2,840,371 | 6/1958 | Frommer | 250—219 |

FOREIGN PATENTS 507,089  6/1939  Great Britain.

RALPH G. NILSON, *Primary Examiner.*

J. D. WALL, *Assistant Examiner.*